June 2, 1953     H. P. PHILLIPS ET AL     2,640,746

PISTON RING

Filed Feb. 29, 1952

INVENTORS.
Harold P. Phillips
Hugo F. Anderson
By O. M. A. Earl
Attorney.

Patented June 2, 1953

2,640,746

UNITED STATES PATENT OFFICE 2,640,746

PISTON RING

Harold P. Phillips and Hugo F. Anderson, Hastings, Mich., assignors to Hastings Manufacturing Company, Hastings, Mich.

Application February 29, 1952, Serial No. 274,108

7 Claims. (Cl. 309—44)

This invention relates to improvements in piston rings.

The main objects of the invention are:

First, to provide a composite piston ring which is desirable for use as a compression ring in internal combustion engines, which has the advantage of quick and effective wear-in and is very durable and efficient in use.

Second, to provide a composite piston ring which includes a cylinder wall contacting element, the cylinder wall contacting surface of which is plated with a wear-resisting material, and at the same time a ring which is efficient during the wearing-in period.

Objects relating to details and economies of the invention will appear from the description to follow. The invention is defined and pointed out in the claims.

A preferred embodiment of the invention is illustrated in the accompanying drawing, in which.

Figure 1:
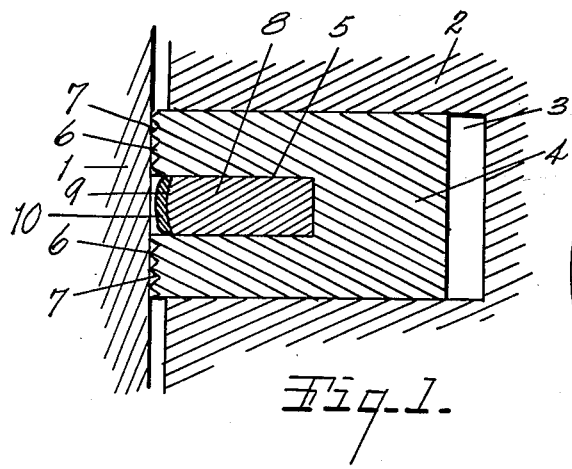
Fig. 1 is a fragmentary sectional view of a piston ring embodying my invention illustrated in assembled relation relative to a piston having a ring groove therein, and a cylinder wall, no attempt being made to show the parts in proper proportions or their working clearances or tolerances.
Figure 3:
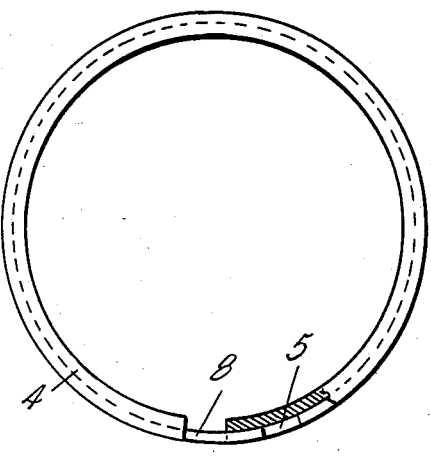
Fig. 3 is a side elevational view with a portion of the body member broken away.
Figure 2:
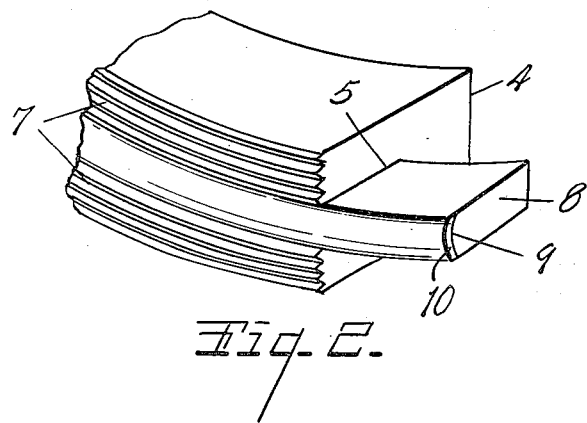
Fig. 2 is a fragmentary perspective view of the embodiment of my invention shown in Figs. 1 and 3.

In the accompanying drawing, 1 represents a cylinder wall, and 2 a piston having a piston ring groove 2 therein. The composite ring of my invention comprises an annular split cast iron body member 4 which is adapted to be received in a piston ring groove such as the groove 3 of the piston shown in Fig. 1. The body member 4 is provided with a relatively narrow annular peripheral groove 5 which in the embodiment shown in Figs. 1, 2 and 3 is axially spaced relative to the sides of the body member providing cylinder wall engaging groove lands 6 at each side of the groove. These lands 6 have thread cut faces 7 providing ribbed relatively quick wear-in cylinder wall engaging surfaces. The ring element 8 is preferably formed of ribbon steel coiled edgewise and is provided with a curved peripheral outer edge 9 having chrome plating 10 thereon.

The radial depth of the ring element 8 is such that when it is seated in the groove its chrome plated cylinder wall engaging face 10 is radially inward or below the peripheries of the quick wear-in wall engaging surfaces 6. It is positioned, however, so that after the initial wear-in of the body member, the ring element 8 constitutes a cylinder wall engaging element. The element 8 having a wear-resisting plating, or being of wear-resisting material provides a very durable wear-resisting cylinder wall engaging surface for the ring. The cast iron body member is relatively much softer and less wear-resisting than the element 8. In most conditions the resilience of the cast iron body member is sufficient so that expanders are not required, although they may be used if desired. The element 8 is preferably arranged to break joint with the body member 4 at the split thereof as is shown in Fig. 3 and in Fig. 2 where the element 8 projects beyond the end of the body member at the split thereof to overlap the other end.

Figure 4:
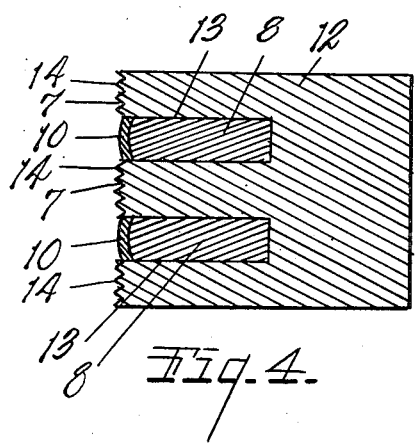
Fig. 4 is a cross sectional view of a modified form or embodiment of my invention.

In the embodiment shown in Fig. 4 the body member 12 is provided with two peripheral grooves 13 corresponding to the groove 5, and the lands 14 between and at the outer sides of the grooves are peripherally ribbed. The ring elements 8 are the same as described and are arranged with their peripheries radially within the quick wear-in faces of the body member so as not to impede the quick wear-in and the efficiency of the ring during the wearing-in period.

Figure 5:
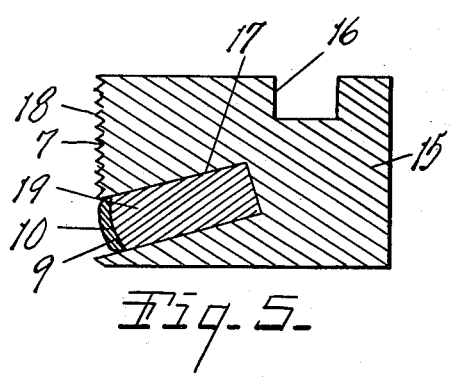
Fig. 5 is a cross sectional view of a canted type of ring embodying my invention.

In the embodiment shown in Fig. 5 the body member 15 is of the canted type, there being an annular groove 16 cut in the upper side thereof which results in a twisting cant of the ring, no attempt being made, however, to illustrate the cant which is relatively slight in a commercial ring.

The body member of this embodiment is substantially that shown in the Phillips Patent 2,387,855 of October 30, 1945. In this embodiment the peripheral groove 17 is disposed diagonally of the body member and opens adjacent the lower side thereof. The peripheral land 18 of the body member above the groove 17 is provided with peripherally extending ribs 14 preferably of A section as shown in the other embodiments.

The ring element 19 designated in Fig. 5 has a chrome plated periphery 10, the ring however being dished when inserted in the groove 17 instead of being flat as is shown in the other embodiments. When the ring elements are formed of ribbon steel as is the preferred form, they may be dished sufficiently to insert them in the inclined diagonally disposed groove.

As stated, no attempt has been made to illustrate the parts in their relative proportions and dimensions or their commercial clearances or tolerances. Piston rings are made in various sizes to meet the requirements of a particular engine, and tolerances and clearances are commonly specified engineering requirements. The grooves or ribs of the body member lands are all exaggerated dimensions. The quick wear-in surfaces may desirably be about .003" in radial depth, and crowns of the ribs may desirably be spaced about .005" apart.

In addition to providing the quick wear-in surfaces for the body member of the ring, the grooves provide lubricant retaining recesses so that efficient lubrication results during the wearing-in period.

Applicants are aware that thread turned or ribbed surfaces have been utilized on cast iron piston rings to facilitate the wearing-in thereof. However, this is an especially desirable feature in combination with the applicants' wear-resisting cylinder wall element of their composite ring as it provides for quick wearing-in and long life, and efficient operation both during and after the wearing-in period.

We have illustrated and described our invention in highly practical embodiments thereof. We have not attempted to illustrate or describe other embodiments or adaptations which we contemplate for certain uses, as it is believed this disclosure will enable those skilled in the art to embody or adapt our invention as may be desired.

Having thus described our invention, what we claim as new and desire to secure by Letters Patent is:

1. A composite piston ring comprising an annular split resilient cast iron body member adapted to be received in a piston ring groove for expansive action therein and having a relatively narrow annular peripheral groove disposed in axially spaced relation to the sides of the body member providing peripheral lands at the sides of the groove, said peripheral lands having thread cut faces providing relatively quick wear-in cylinder wall engaging surfaces, and an annular split expandable ring element of ribbon steel coiled edgewise disposed in said groove in supported relation to the bottom and sides thereof and having a chrome plated peripheral cylinder wall engaging surface initially positioned radially below the said quick wear-in cylinder wall engaging surfaces of said body member and so as not to impede the quick wearing in thereof when the ring is installed.

2. A composite piston ring comprising an annular split resilient cast iron body member adapted to be received in a piston ring groove for expansive action therein and having a relatively narrow annular peripheral groove disposed in axially spaced relation to the sides of the body member providing peripheral lands at the sides of the groove, said peripheral lands having the faces thereof roughened providing relatively quick wear-in cylinder wall engaging surfaces, and an annular split expandable ring element of ribbon steel coiled edgewise disposed in said groove in supported relation to the bottom thereof and having a chrome plated peripheral cylinder wall engaging surface which is initially radially within the peripheries of the said quick wear-in cylinder wall engaging surfaces of said body member and so as not to impede the quick wearing in thereof when the ring is installed.

3. A composite piston ring comprising an annular split resilient cast iron body member adapted to be received in a piston ring groove for expansive action therein and having a relatively narrow annular peripheral groove disposed in axially spaced relation to the sides of the body member providing peripheral lands at the sides of the groove, said peripheral lands having the faces thereof roughened providing relatively quick wear-in cylinder wall engaging surfaces, and an annular split expandable ring element of ribbon steel coiled edgewise disposed in said groove in supportedly seated relation to the bottom thereof and in axially supported relation to the side walls of the groove and having a peripheral cylinder wall engaging surface which is initially substantially spaced radially inward relative to the peripheries of the said quick wear-in cylinder wall engaging surfaces of said body member and so as not to impede the quick wearing in thereof when the ring is installed.

4. A composite piston ring comprising an annular split resilient cast iron body member adapted to be received in a piston ring groove for expansive action therein and having a relatively narrow annular perpiheral groove disposed to provide at least one peripheral land at the side of the groove, said peripheral land having a roughened face providing a relatively quick wear-in cylinder wall engaging surface, and an annular split expandable wear resisting ring element disposed in said groove in supported relation to the bottom and sides thereof and having a chrome plated peripheral cylinder wall engaging surface initially positioned radially inward relative to the said quick wear-in cylinder wall engaging surface of said body member so that it does not impede the quick wearing in thereof when the ring is installed.

5. A composite piston ring comprising an annular split expansible cast iron body member adapted to be received in a piston ring groove for expansive action therein and having relatively narrow annular peripheral grooves, the peripheral face of the body member at one side of the groove having relatively narrow peripherally extending ribs providing a relatively quick cylinder wall engaging wear-in surface, and an annular split expandable ring element disposed in said groove in supportedly seated relation to the bottom thereof and having a near resisting peripheral cylinder wall engaging surface initially positioned in substantially radially inwardly spaced relation to the periphery of the said quick wear-in surface of said body member so as not to impede the wearing in thereof when the ring is installed but which constitutes a cylinder wall engaging element after such wearing in has occurred.

6. A composite piston ring comprising an annular split resilient cast iron body member adapted to be received in a piston ring groove for expansive action therein and having axially spaced relatively narrow annular peripheral grooves axially spaced relative to each other and to the sides of the body members to provide peripheral lands at the sides of the grooves, the faces of said peripheral lands initially having relatively narrow peripherally extending ribs providing relatively quick cylinder wall engaging wear-in surfaces, and axially thin annular split expandable ring elements disposed in said grooves in supported relation to the walls thereof and having wear-resisting peripheral cylinder wall engaging surfaces initially positioned radially inward relative to the said quick wear-in surfaces of said body member so as not to impede the wearing-in thereof when the ring is installed but constitute cylinder wall engaging elements after such wear-in has occurred.

7. A composite piston ring comprising an annular split canted cast iron body member adapted to be received in a piston ring groove for expansive action therein and having relatively narrow annular diagonally disposed peripheral groove opening adjacent to the lower side of the body member, the peripheral face of the body member above the groove having relatively narrow peripherally extending ribs providing a relatively quick cylinder wall engaging wear-in surface, and an axially thin annular expandable ring element disposed in said groove and having a wear-resisting peripheral cylinder wall engaging surface initially positioned radially below the said quick wear-in surface of said body member so as not to impede the wear-in thereof when the ring is installed but which constitutes a cylinder wall engaging element after such wear-in has occurred.

HAROLD P. PHILLIPS.
HUGO F. ANDERSON.

References Cited in the file of this patent

FOREIGN PATENTS

| Number | Country | Date |
|---|---|---|
| 49,834 | France | May 1, 1939 |
| | (Addition to 841,856) | |
| 113,886 | Sweden | Apr. 24, 1945 |
| 877,905 | France | Sept. 21, 1942 |